United States Patent

[11] 3,617,385

| [72] | Inventor | Foster L. Gray<br>Dallas, Tex. |
|---|---|---|
| [21] | Appl. No. | 806,838 |
| [22] | Filed | Mar. 13, 1969 |
| [45] | Patented | Nov. 2, 1971 |
| [73] | Assignee | Texas Instruments Incorporated<br>Dallas, Tex. |

[54] FUEL CELL
8 Claims, 6 Drawing Figs.

[52] U.S. Cl.................................................. 136/86,
136/120
[51] Int. Cl.................................................. H01m 27/04
[50] Field of Search.......................................... 136/86, 120
FC

[56] References Cited
UNITED STATES PATENTS
3,492,161  1/1970  Hooper et al.................  136/86

Primary Examiner—Allen B. Curtis
Attorneys—Samuel M. Mims, Jr., James O. Dixon, Andrew M. Hassell, Harold Levine, Melvin Sharp and John M. Harrison ABSTRACT: A fuel cell electrode subassembly for a multicell power package having at least a pair of thin, porous, elongated electrodes, e.g. cathodes, which are operatively spaced to receive an anode carrying a molded matrix and are connected in series to a third thin, porous electrode, e.g. an anode, which is aligned with the space between the first two electrodes hermetically sealed with an electrically conductive material. Each subassembly can be interfitted with other subassemblies to yield several series connected fuel cell arrays.

FUEL CELL

This invention relates to fuel cells. In another aspect, this invention relates to a novel fuel cell electrode subassembly. Still another aspect of this invention relates to a novel method of assembling a multicell fuel cell power package having a multiplicity of parallel connected and series connected cells.

A conventional fuel cell configuration includes at least a pair of porous, conductive electrodes (at least one cathode and one anode) spaced apart and contacted by an electrolyte which is carried by a matrix of dielectric material, which provides a multiplicity of pores. In the operation of this cell, a suitable reactant gas is passed to each electrode and contacts electrolyte in the porous structure of each electrode to provide for cell reaction. Thus, at each electrode, a half cell chemical reaction occurs: between reductant and electrolyte at one electrode and between oxidizer and electrolyte at the other electrode. These reactions create an electric potential between the electrodes, and thereby furnish electric power to an external circuit.

The present trend in fuel cell development is toward lighter, smaller and thinner fuel cells. The trend has resulted in the development of closely spaced anodes and cathodes, and therefore, in very thin but uniform electrolyte containing matrices. It is generally necessary that the thin matrices utilized in the cells be uniform in thickness and porosity so that a substantially uniform contact of electrolyte is made with the surface of the electrodes.

One method of forming the thin matrices is initially to form a molding composition of matrix material and then apply this material uniformly on the surface of an electrode, for example, the anode. The cathode is then placed against the exposed surface of the matrix to form a fuel cell unit. The electrolyte can be added to the matrix by depositing electrolyte on the exposed matrix area between the electrodes. The electrolyte will then wick through and saturate the thin matrix between the electrodes.

When assembling these fuel cells to produce a relatively light and compact multicell power package, it is generally desirable to connect a multiplicity of cells both in parallel and in series. A conventional arrangement comprises a multiplicity of fuel cell arrays, each containing several thin, porous anodes and cathodes spaced by electrolyte carrying matrices, and each array connected in series. The fuel cell is arranged so that an oxidizer fluid will be directed in parallel through flow paths in each of the cathodes, and a fuel will pass simultaneously through flow paths in the anodes in each array.

It is generally very difficult to assemble a multicell power unit of the type described above which does not have a substantial amount of leakage of the fuel and/or oxidizer fluids between the arrays, and which does not have a rather high internal resistance as a result of the conventional methods used to join the electrodes together. Very small, elongated welding electrodes have been developed to spot weld the various components together. However, it is generally very difficult to inspect the welds to insure proper contact has been made. Another difficulty is that the most corrosion-resistant material yet found for fuel cells under both reducing gas conditions and oxidizing conditions in the presence of a corrosive electrolyte, e.g., molten sodium lithium carbonate electrolyte (stainless steel) does not spot weld readily. The welds are brittle and prone to fracture. Additionally, the welded joint must be hermetic to prevent fuel leakage from the fuel cell. This has conventionally required a tremendous number of overlapping or closely spaced welds. This welding procedure is not only costly but very difficult to perform. A further difficulty is that the welds must carry all the current in the series electrical hookup of fuel cells. This alone requires many welds to decrease cell internal resistance.

Therefore, one object of this invention is to provide novel fuel cell electrode subassemblies which can be easily interfitted when assembling a multicell power package.

Another object of this invention is to provide a novel method of assembling a multicell fuel cell power package wherein the connection between the series connected electrodes are substantially hermetic and provide a minimum internal cell resistance.

A further object of this invention is to provide a novel method of fabricating a fuel cell electrode.

According to one embodiment of this invention, a fuel cell electrode subassembly is provided which comprises at least a pair of spaced, parallel positioned, porous electrodes (for example oxidizer electrodes having oxidizer flow paths positioned therethrough) which are connected in series to an abutting thin, porous third electrode (for example an anode having fuel flow paths positioned therethrough) which third electrode is aligned with the space between the pair of electrodes, the connection between the three electrodes being sealed with an electrically conductive material to yield a substantially hermetic seal therebetween.

According to another embodiment of this invention, the electrode subassembly of the first embodiment is produced by initially attaching the three electrodes together by suitable means such as spot welding, and applying a suitable braze at the points of contact. The subassembly is then heated to the braze temperature to allow the electrically conductive hermetic seal to form.

According to another embodiment of this invention, a braze is applied to the surface of a suitable substrate material for an electrode and then subjected to a brazing temperature to thereby cause a catalytically active surface to form on the substrate. For example, a nickel braze material is applied to a stainless steel mesh in the form of an electrode and then heated to the melting point of the braze material causing it to flow over the surface of the stainless steel mesh to form a catalytically active nickel surface on the mesh.

This invention can be more easily understood from a study of the drawings in which.

Figure 1:
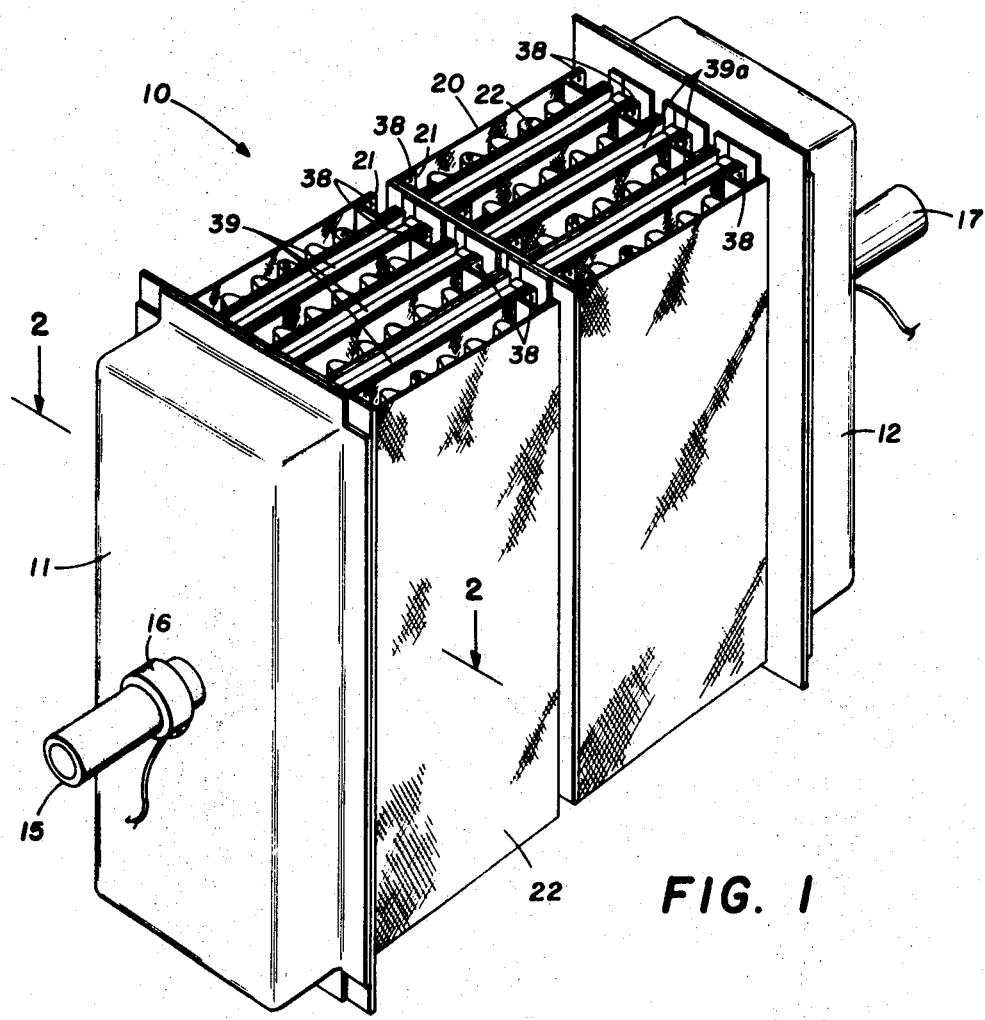
FIG. 1 is a perspective view of a multicell power package which has been fabricated using the fuel cell electrode subassembly of this invention.
Figure 2:
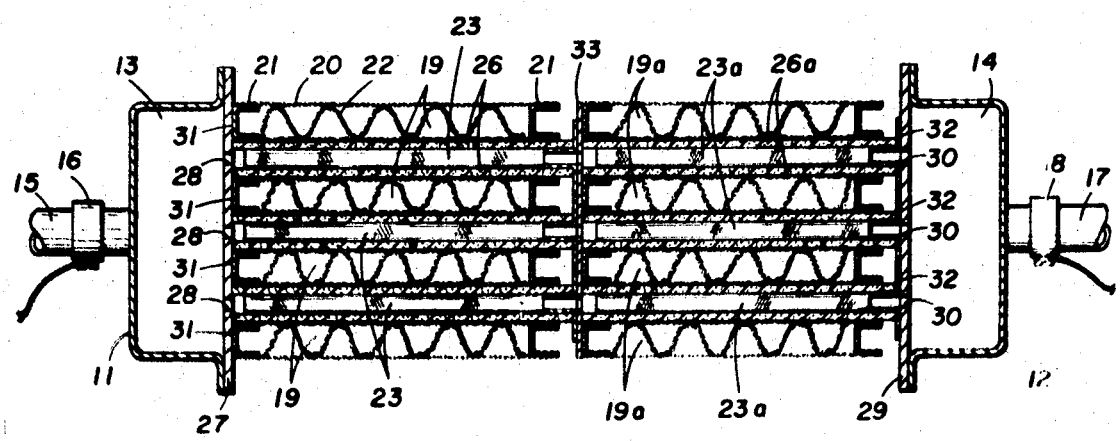
FIG. 2 is a sectional view taken along lines 2—2 of FIG. 1.

Now referring to FIGS. 1 and 2, fuel cell unit 10 generally comprises a multicell power package incorporating fuel cells interconnected in series and in parallel. As shown, fuel cell unit 10 comprises two arrays of electrodes connected in series, each array containing six parallel connected cells. Fuel cell unit 10 can carry any number of desired arrays containing any desired number of fuel cells in each array. Thus, the number of fuel cells in unit 10 is not intended to limited the scope of this invention.

Enclosures 11 and 12 which carry carry cavities 13 and 14, respectively, are connected at opposite ends of fuel cell unit 10. Fuel inlet conduit 15 communicates through enclosure 11 and has annular electric terminal 16 operatively attached thereto. In similar manner, fuel outlet conduit 17 communicates through the enclosure 12 and has annular electric terminal 18 operatively connected thereto. Electrical conductive wires lead from terminal 16 and terminal 18 to a suitable circuit.

Now referring to FIG. 2, electrodes 19 in the first array are identical to electrodes 19a in the second array. Electrodes 19 and 19a are thin, porous, generally rectangular members and comprise two side sheet members 20 held apart by end channels 21, and a corrugated member 22 welded therebetween. Electrodes 19 and 19a serve as the cathodes for fuel cell unit 10 and can be made of any suitable material known in the art. For example, channels 21 can be made of any corrosion-resistant structural material such as stainless steel, and side sheet members 20 and corrugated member 22 can be made of any suitable porous cathode material known in the art such as 80-150 mesh silver plated stainless steel screen, for example.

Figure 3:
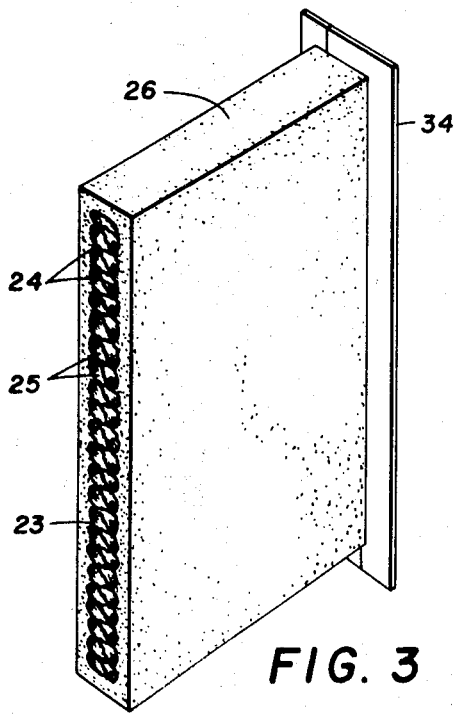
FIG. 3 is a perspective view of an oxidizer electrode carrying a matrix molded thereon which is utilized in the fuel cell of FIG. 1.

Now referring to FIGS. 2 and 3, electrodes 23 in the first array are identical to electrodes 23a in the second array, and serve as the anodes in fuel cell unit 10. Electrodes 23 and 23a are thin, porous, generally rectangular members and comprise a single sheet metal screen formed into a series of teardrop-shaped folds. The teardrop-shaped folds are held together by brazing or spot welding points of contact such as illustrated at points 24 (FIG. 3). This folded pattern allows reactive fuel to freely flow through spaces 25 (FIG. 3). Alternately, a variety of other electrode structures can be utilized for electrodes 23 and 23a. For example, a coarse wire mesh similar to a kitchen scour pad can be used, or a number of cylindrical tubular-shaped pieces stacked one on another can be used. Electrodes 23 and 23a can be made from any suitable anode material. For example, 80-150 mesh nickel screen. According to one embodiment of this invention which will be described below, electrodes 23 and 23a can be made of a stainless steel screen which is coated with a suitable nickel braze material, subjected to a brazing operation to thereby coat the screen and form an effective catalytic coating therefor.

Electrodes 23 and 23a carry matrices 26 and 26a, respectively, molded around the outside periphery thereof. An electrode 23 carrying a matrix 26 is illustrated in FIG. 3. Matrices 26 and 26a are molded by a suitable process such as disclosed in my copending U.S. Pat. application Ser. No. 806,901 filed on March 13, 1969. These matrices are porous, crack-free ceramic bodies having high structural integrity and resistance to cracking and permanent distortion when subjected to temperature extremes. As disclosed in my above-described copending application, a suitable matrix material comprises magnesium oxide particles which are at least partially sintered and at least partially bonded together by a dissimilar bonding agent such as an alkali metal phosphate.

The electrical connections between the electrodes and electrical terminals 16 and 18 are schematically illustrated in FIG. 2. Conductive end plate 27 is connected such as by welding with conductive enclosure 11. Slots 28 through conductive end plate 27 communicate from chamber 13 to spaces 25 within the electrodes 23 and 23a. Likewise, conductive end plate 29 is connected such as by welding to conductive enclosure 12 and thereby communicates with electrical terminal 18. Slots 30 communicate between chamber 14 and spaces 25 of electrodes 23a and 23. Electrodes 19 are operatively connected to conductive end plate 27 at points 31 while electrodes 23 are spaced and thereby insulated from conductive end plate 27. Electrodes 23a are operatively connected to conductive end plate 29 at points 32 while electrodes 19a are spaced and insulated from conductive end plate 29. Electrodes 23 and 19a are connected to slotted plate member 33 to form a series connection which will be described in detail below. Additionally, electrodes 19 and electrodes 19a respectively are connected in parallel. This connection will be described in detail below.

Fuel cell unit 10 will operate in any conventional manner. This particular system can effectively use various molten alkali metal carbonates as electrolytes. A preferred electrolyte is a eutectic mixture of sodium carbonate and lithium carbonate, e.g., 50 percent molar sodium carbonate and 50 percent molar lithium carbonate having a melting point of about 500° C. The matrices are initially impregnated with the electrolyte. Fuel cell unit 10 is placed in any suitable environment wherein an oxidizer reactant will continuously pass through electrodes 19 and 19a. Electrodes 23 and 23a are provided with a suitable fuel via fuel inlet conduit 15 and chamber 13. Fuel cell unit 10 will function with a variety of reactants, but the preferred system is a fuel feed comprising hydrogen and oxidizer feed mixture comprising oxygen and carbon dioxide. The hydrogen can be either pure or mixed along with various other gases such as nitrogen, carbon dioxide, carbon monoxide, light hydrocarbons, water vapor, and the like. The oxygen can be either pure or supplied as air. Thus, fuel cell unit 10 is placed in any suitable heating device which is supplied with the above described oxidizer atmosphere and maintained at a temperature in the vicinity of 600° C. e.g., about 650° to 700° C. For example, placing fuel cell unit 10 within a ceramic-walled oven (or other insulated casing means) which is provided with a gaseous flow of oxygen and carbon dioxide, or air and carbon dioxide, in a direction parallel to electrodes 19 and 19a, will suffice.

The hydrogen is then passed through fuel inlet conduit 15, into chamber 13 and through slots 28, spaces 25 of electrodes 23 and 23a to chamber 14. The reaction occurring at electrodes 23 and 23a (the anodes) is as follows:

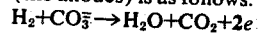

$$H_2 + CO_3^= \rightarrow H_2O + CO_2 + 2e$$

The oxygen and carbon dioxide which passes through electrodes 19 and 19a and surrounds fuel cell unit 10 within the heating device will react as follows when contact is made with electrodes 19 and 19a. (the cathodes):

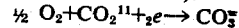

$$\tfrac{1}{2} O_2 + CO_2^{11} + {}_2e \rightarrow CO_3^=$$

Figure 4:
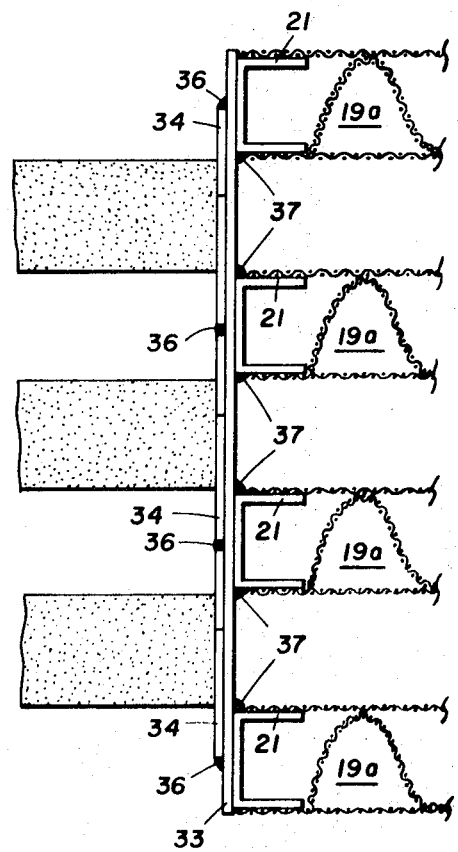
FIG. 4 is a plan, partial view of an electrode subassembly of this invention.
Figure 5:
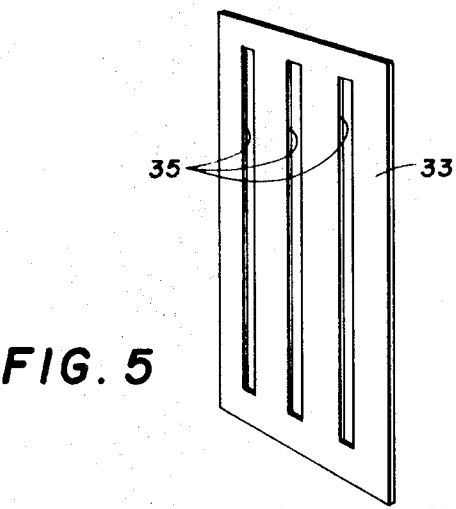
FIG. 5 is a perspective view of a slotted plate used to form an electrode subassembly according to one embodiment of this invention.

The fuel cell subassembly of this invention is illustrated in FIG. 4. As illustrated, electrodes 23 are connected by their flanges 34 to slotted plate 33. Additionally, cathodes 19a are attached in spaced parallel relationship on the opposite side of slotted plate 33. It is noted that the unattached ends of electrodes 23 and 19a are not shown in FIG. 4. Electrodes 23 are illustrated in FIG. 3 and comprise a conductive flange member operatively connected to a teardrop-shaped porous electrode which carries a matrix 26 molded about its periphery. Matrix 26 must be a porous ceramic material capable of holding a suitable electrolyte such as an alkali metal carbonate, and must be resistant to cracking and permanent warping when subjected to extreme thermal cycling during the brazing operations of the invention. A suitable matrix composition which satisfies these criteria is disclosed in my above described copending application.

Slotted plate 33 comprises a thin, generally rectangular plate carrying elongated slots 35 which cooperate with flow spaces 25 of electrodes 23 and 23a. Plate 33 is generally made of a conductive corrosion-resistant material such as stainless steel. It is preferred that slots 35 be slightly narrower than the width of electrodes 23 and 23a and thereby serve as electrolyte dams in a manner disclosed in the copending U.S. Pat. application of James K. Truitt, Ser. No. 788,208, filed Dec. 31, 1968 (TI 3256).

By the practice of one embodiment of this invention, at least a pair of thin, porous and generally rectangular electrodes are spaced in parallel relationship and joined at adjacent ends to an abutting third electrode which is aligned with the space between the pair. The electrodes can be either joined such as by spot welding flanges 34 directly to channels 21, or they can be joined to slotted plate 33 such as by welding as illustrated in the drawing. This arrangement will form a basic repeating unit of an electrode subassembly. Thus, the basic repeating unit can consist of two cathodes connected to one anode or any other desired combination such as four cathodes joined to three anodes as illustrated in FIG. 4. Additionally, if desired the large number of electrodes in a repeating unit can be anodes, for example, two anodes joined to one cathode.

Referring again to FIG. 4, three electrodes 23 each carrying a matrix 26 are aligned with slots 35 and attached to slotted plate 33 by suitable means such as spot welding. Additionally, four electrodes 19a are positioned on the other side of slotted plate 33 in alternating spaced relationship to abutting electrodes 23 and spot welded thereto. The spot or tack welds can be made in a conventional manner and generally can be made at intervals of about 0.05 to 0.250 inches along the length of slotted plate 33. When the connections between the electrodes are made without slotted plate 33, the spot welds are made in a similar manner along the length of the flanges 34 and channels 21.

During construction of the fuel cell subassembly, a suitable braze material is applied to the areas of contact between flanges 34 and slotted plate 33 and channels 21 and slotted plate 33. The braze material can be applied either before or after the spot welding. It is generally preferred that the braze material be applied between flanges 34 and plate 33, and channels 21 and plate 33 before the spot welding operation. However, satisfactory results have been experienced when applying the braze material along the edges of flanges 34 and channels 21 after the spot welding operation. In both methods, it has been found that the braze flows sufficiently well to provide very even electrical contact between the electrodes but yet form a hermetic seal around flanges 34.

The braze material used in the practice of this invention can be any suitable electrically conductive corrosion-resistant braze material which will melt and flow on flanges 34 and channels 21 at a temperature below the melting point of any of the electrode components. Thus, since electrodes 19a comprise silver screen, the braze must melt and flow below the melting point of silver which is 961° C. It is generally preferred that the braze melt and flow at a temperature at or below 900° C. It is generally preferred that nickel braze materials containing from about 60 to about 90 weight percent nickel be used. Suitable braze materials include: ASTM Designation BNi-6 (11 weight percent phosphorous, 89 weight percent nickel and a melting point of 876° C), such as the material sold under the trademark of Nicrobraz 10 by Wall Colmonoy Corporation, Detroit, Michigan; and ASTM BNi-7 (13 weight percent chromium, 10 weight percent phosphorous, 67 weight percent nickel, and a melting point of 888° C.), such as the material sold under the trademark of Nicobraz 50 by Wall Colmonoy Corporation, Detroit, Michigan. These braze materials are available generally as a powder or plastic-bonded wire or sheet. It is generally preferable to use a powdered braze admixed with a suitable binder material such as an acrylic cement which is nondeleterious to the flanges and braze and which will substantially deteriorate during the brazing operation. The powder-cement material applies easily with a brush or similar means and leaves no residue to contaminate the braze joint. The amount of cement used with the braze powder is not critical and need be only a sufficient amount to agglomerate the powder and allow it to be painted on the surface to be brazed.

After the braze has been applied and the electrodes spot welded together, the parts can be conveniently brazed in a controlled atmosphere furnace. Vacuum brazing of stainless steel parts can be carried out at a pressure below 5 mm. of mercury. Hydrogen brazing can also be used for stainless steel, but the atmosphere generally must have a moisture content of less than about 55 parts per million to prevent formation of chromium oxide, $Cr_2O_3$. The chromium oxide can prevent wetting of the metal by the braze. Chain conveyor, muffle furnaces, and removable muffle furnaces can be used in the brazing operation.

It is generally preferred to braze the stainless steel metal parts for rather long periods of time above the braze melting point since this increases the joint ductility due to diffusion of braze in the joint metals. Also, it is generally preferred to combine vacuum brazing steps with hydrogen brazing steps. Typical braze times include from about 1 to about 4 hours. An example of a preferred braze cycle includes an initial heating from 50 minutes to 60 minutes at 300° to to 350° C. in vacuum followed by a period from 45 minutes to 60 minutes at about 800° in vacuum which is followed by a braze period of from 10 to 15 minutes at 900° to 950° C. in hydrogen. After this the brazed assembly is cooled to about 500° C. during about a 50 minute interval in hydrogen which is followed by a cooling procedure from 500° C. to room temperature which can occur in an atmosphere of hydrogen or nitrogen. Generally it is preferred that the cooling from 500° C. to 300° C. occur in hydrogen or nitrogen. The cooling from 300° C. to room temperature can conveniently occur in air.

After the brazing cycle a continuous electrically conducting hermetic seal 36 is formed around flanges 34. Additionally, a continuous electrically conducting seal 37 occurs around the ends of electrodes 23 as illustrated in FIG. 4.

If desired, several of the subassemblies can be interfitted together to form any desired number of series connected arrays by successively interfitting the anodes in one subassembly between the cathodes of another subassembly. Thus, a multitude of the assemblies as illustrated in FIG. 4 can be interfitted together to form a multiplicity of series connected arrays. The internal electric resistance of the series connections can be tested by conventional techniques before the construction of the multicell unit is completed.

The fuel cell power package illustrated is FIG. 1 is given for illustrative purposes and contains only one fuel cell electrode subassembly as illustrated in FIG. 4. Electrodes 23a which are to be welded and brazed to conductive end plate 29 are inserted within spaces between electrodes 19a of the subassembly of FIG. 4. Likewise, electrodes 19 which are to be welded and brazed to conductive end plate 27 are positioned on either side of electrodes 23 of subassembly of FIG. 4.

Figure 6:
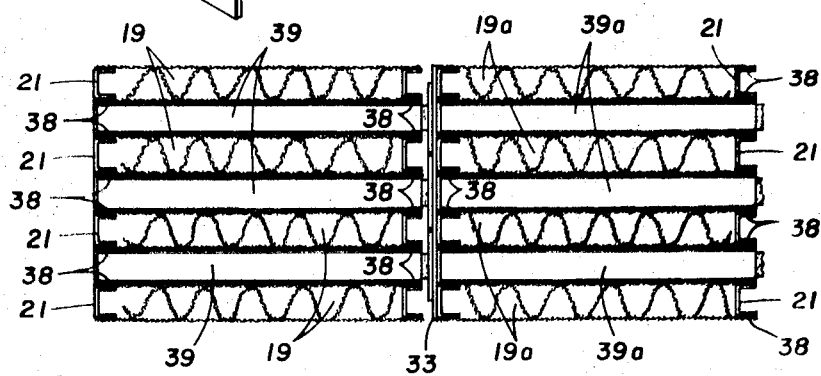
FIG. 6 is a plan view of the assembled and connected electrodes of the fuel cell unit of FIG. 1.

After electrodes 19 and 23a are interfitted with the electrode subassembly as illustrated in FIG. 4, channels 39 and 39a are positioned on the top and bottom of matrices 26 and 26a, respectively. Channels 39 and 39a are then tack welded to channels 21 of electrodes 19 and 19a at points 38 to form parallel electrical connections between electrodes 19 and 19a in the two arrays, respectively, as illustrated in FIGS. 6 and 1. Additionally, if desired, side screen members 20 can be spot welded to channels 39 and 39a. The connection between electrodes 19 and channels 39 will clamp electrodes 23 carrying matrices 26 therebetween in operative relationship. Likewise, the connection between electrodes 19a and channels 39a will clamp electrodes 23a carrying matrices 26a therebetween in operative relationship.

The fuel cell made with the brazed electrode subassemblies of this invention will exhibit a lower internal electric resistance than heretofore known in the art. Additionally, no leakage of the fuel from under flanges 34 will occur to decrease the efficiency of the fuel cell operation.

According to another embodiment of this invention, a fuel cell electrode is coated with a catalytic material during a brazing operation. By this technique, electrodes 23 and 23a can initially be formed from a porous nonoxidizing support such as 80-150 mesh stainless steel screen. This screen is formed into an operative shape such as the teardrop shape illustrated in FIG. 3 and painted with a braze material such as the above-described braze-acrylic cement mix. Sufficient cement being present to agglomerate the braze powder and hold it onto the screen. In this manner, the screen is coated with a very thin braze powder-cement coat. The screen is then subjected to a brazing cycle to allow the braze to flow completely over the surface of the screen wires to form the catalytic coat. Preferably, this brazing operation will occur before matrix 26 is molded onto electrode 23; however, this technique can be used after matrix 26 has been molded onto the electrode. In the latter instance, the electrode coating procedure can be carried out concurrently with the brazing operation for the fuel cell electrode subassembly.

While this invention has been described in relation to its preferred embodiments, various modifications which fall within the scope of the appended claims will now be apparent to one skilled in the art from the reading of this disclosure.

I claim:

1. A fuel cell electrode subassembly comprising:
   at least one pair of substantially identical thin, porous, generally rectangular electrodes, each having reactant flow paths extending through one axis thereof, said pair being spaced in a parallel relationship and attached at one end to a third thin, porous, generally rectangular electrode having reactant flow paths extending through an axis thereof, said third electrode aligned with the space between said pair and having one end thereof attached to adjacent ends of said pair, the attachment between said electrodes being electrically conductive and substantially hermetic.

2. A fuel cell electrode subassembly of claim 1 wherein the reactant flow paths extending through one axis of said pair are substantially parallel to said attachment and wherein the reactant flow paths extending through said third electrode are positioned at about 90° from the flow paths of said pair.

3. The fuel cell electrode subassembly of claim 2 wherein said attachment comprises a nickel braze material.

4. The fuel cell electrode subassembly of claim 2 wherein said third electrode has a porous matrix for carrying electrolyte operatively molded about its periphery.

5. A fuel cell electrode subassembly for a fuel cell power package having a plurality of fuel cell electrode arrays interconnected in series, each array having at least one thin, porous, generally rectangular-shaped electrode of a first type serving as an oxidizer electrode and having a plurality of oxidizer flow paths positioned axially therethrough; at least one thin, porous, generally rectangular electrode of a second type serving as a fuel electrode and having a plurality of fuel flow paths positioned axially therethrough; and an electrolyte carrying matrix positioned operatively between said first and second type electrodes, and a pair of electrodes of one said type connected in series with a third electrode of the other said type so that the electrodes of said pair are positioned in a parallel relationship and spaced at a distance substantially equal to the thickness of the electrode of the other type and a pair of matrices, and said third electrode is aligned with said space and attached at one end to adjacent ends of said pair.

6. The fuel cell electrode subassembly of claim 5 wherein said pair of electrodes are electrodes of the said first type having said oxidizer flow paths positioned substantially parallel to said connection, and wherein said third electrode is an electrode of said second type having said fuel flow paths positioned therethrough at about 90° from the flow paths of said pair.

7. The fuel cell electrode subassembly of claim 6 wherein said electrodes are connected to a conductive metal plate positioned between said pair of electrodes and said third electrode, which plate has an elongated slot in communication with the fuel flow paths through said third electrode.

8. The fuel cell electrode subassembly of claim 6 wherein said third electrode has a layer of a catalytically active metal on the surface thereof.

* * * * *